Figures 3, 4:
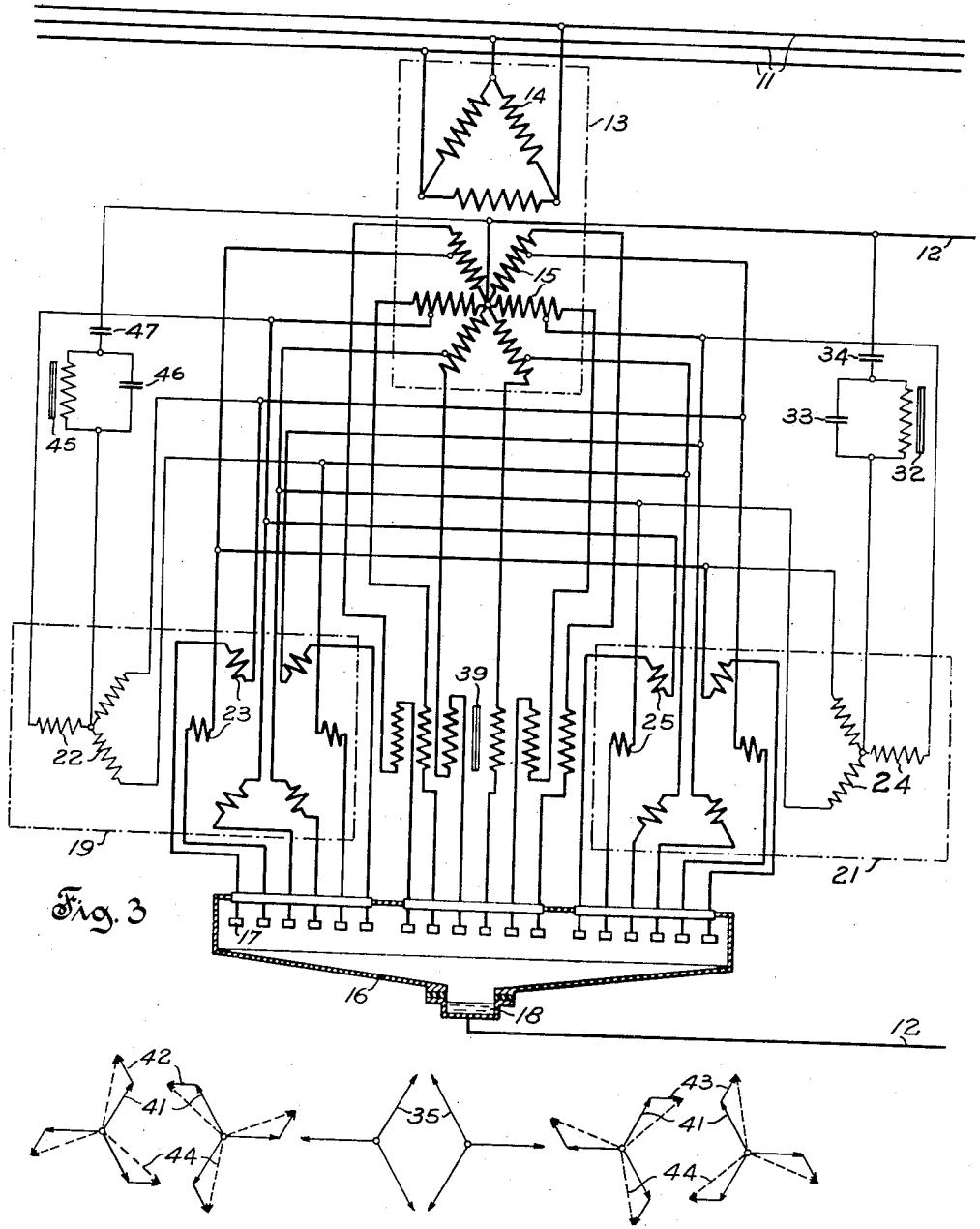

Sept. 16, 1941.  I. K. DORTORT  2,256,383
ELECTRIC CURRENT CONVERTING SYSTEM
Filed April 10, 1939  3 Sheets-Sheet 1
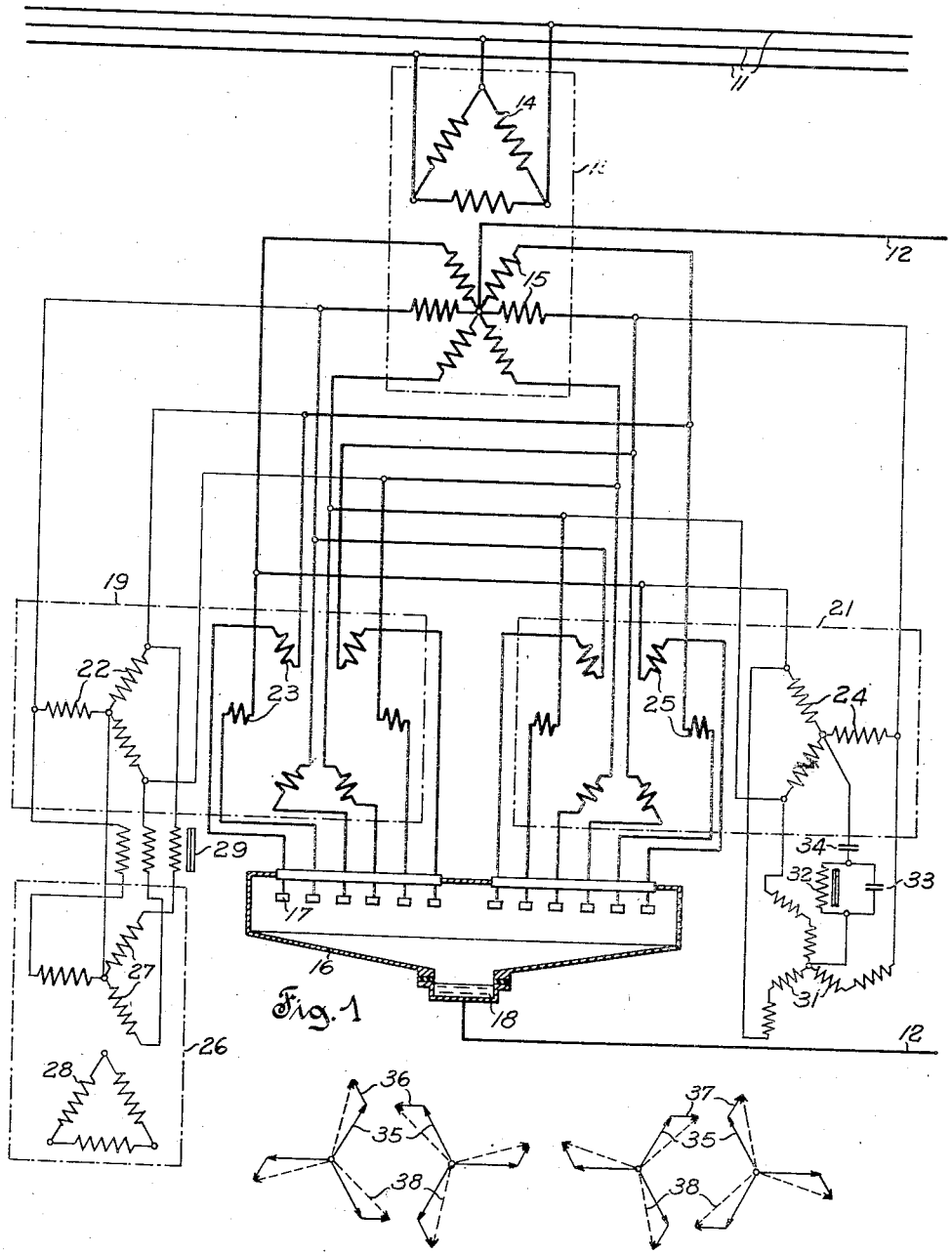

Sept. 16, 1941.  I. K. DORTORT  2,256,383
ELECTRIC CURRENT CONVERTING SYSTEM
Filed April 10, 1939  3 Sheets-Sheet 3

Inventor
I. K. Dortort
by
Attorney

Patented Sept. 16, 1941

2,256,383

UNITED STATES PATENT OFFICE 2,256,383

ELECTRIC CURRENT CONVERTING SYSTEM

Isadore K. Dortort, Milwaukee, Wis., assignor to Allis-Chalmers Manufacturing Company, Milwaukee, Wis., a corporation of Delaware Application April 10, 1939, Serial No. 267,069

25 Claims. (Cl. 175—363)

This invention relates in general to improvements in electric current converting systems and more particularly to means for controlling the flow of alternating current components of different frequencies in the connections of a converting system joining an alternating current circuit with a direct current circuit.

When an electric current converting system comprising electric valves is used for transmitting current between a polyphase alternating current circuit and a direct current circuit, alternating current components of different frequencies generally flow in the connections established between the circuits. To reduce the number of such current components, and for other reasons, the valves of the system are frequently connected with the alternating current circuit through a suitable phase multiplying transformer. For example, alternating current rectifying systems generally comprise a phase doubling transformer having a three phase primary winding and a six phase secondary winding having each phase portion thereof inductively related with only one of the legs of the associated core. The transformer windings may therefore be symmetrically arranged to cause the voltages thereof to form a well-balanced polyphase system of voltages. When it is desired further to increase the number of transformer phase portions, windings are often utilized in which each phase portion is divided into sections associated with different legs of the core. The transformer then becomes excessively complicated and generally fails to present the expected accurately balanced polyphase system of secondary voltages, so that some of the current components which should be inherently suppressed in the connections of the system may, on the contrary, have considerable magnitudes therein.

It is therefore preferable to utilize a main transformer which either leaves the number of phases unaltered or which only doubles the number of phases and further to increase the number of phases by the use of phase shifting means such as phase shifting transformers connected with the main transformer secondary winding. The connections of the system are preferably so effected as to divide the valves of the system into a plurality of groups carrying current simultaneously at every instant. If the phase shifting transformers are provided with star connected primary windings, means may be provided for insuring balancing of the magnitudes of the phase voltages of the different phase portions.

It is therefore one of the objects of the present invention to provide an electric current converting system comprising a plurality of electric valves and a transformer in which a plurality of valves receive current of different phases from each of the secondary phase portions of the transformer.

Another object of the present invention is to provide an electric current converting system comprising a plurality of electric valves and a transformer in which the currents flowing through the valves form a polyphase system having a number of phases greater than the number of phases of the transformer secondary winding.

Another object of the present invention is to provide an electric current converting system comprising a plurality of electric valves and a transformer in which the periods of current flow through the valves are extended by linking the circuit of each valve with a plurality of phases of the alternating current circuit.

Another object of the present invention is to provide an electric current translating system utilizing a transformer having a star connected winding in which the voltages of the different transformer phase portions are balanced regardless of the magnetic characteristics of the core thereof.

Figures 5, 6:
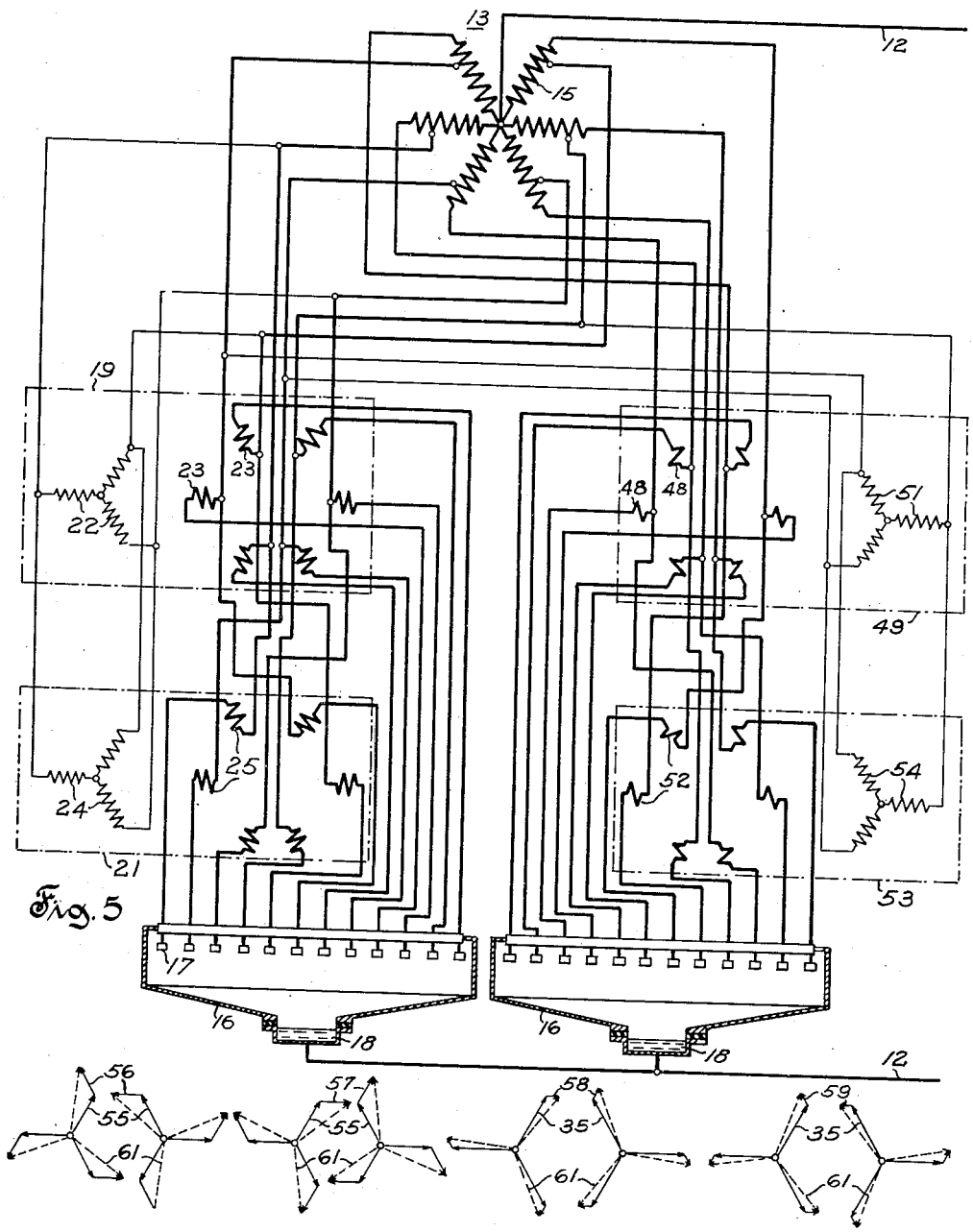

Objects and advantages of the present invention other than those above set forth will be apparent from the following description when read in connection with the accompanying drawings, in which:

Fig. 1 diagrammatically illustrates a rectifying-inverting system in which the number of phases of the system is increased from six to twelve by means of two phase shifting transformers connected between the main transformer and the valves of the system;

Fig. 2 is a vector diagram of the secondary voltages of the transformers of the embodiment illustrated in Fig. 1;

Fig. 3 diagrammatically illustrates a modified embodiment of the present invention for increasing the number of phases of the system from six to eighteen;

Fig. 4 is a vector diagram of the secondary voltages of the transformers of the embodiment illustrated in Fig. 3;

Fig. 5 diagrammatically illustrates the essential elements of another modified embodiment of the present invention for increasing the number of phases of the system from six to twenty-four; and Fig. 6 is a vector diagram of the secondary voltages of the transformers of the embodiment illustrated in Fig. 5.

Elements having the same function in the different embodiments are designated therein by the same reference character, although such elements may be of different configurations in the several embodiments shown. It will be understood that elements illustrated in some of the figures may also be utilized in combination with elements illustrated in other figures to form further embodiments of the present invention.

Referring more particularly to Fig. 1 of the drawings by characters of reference, reference number 11 designates a polyphase alternating current circuit to be interconnected with a direct current circuit 12 through a converting system comprising a polyphase transformer 13. Transformer 13 comprises a winding 14 connected with circuit 11 and a winding 15 divided into a plurality of phase portions connected to form a polyphase system of a predetermined number of phases. Circuit 11 is assumed herein to be of the three phase type generally utilized in practice and winding 14 is therefore also of the three phase type. Winding 15 is a six phase star connected winding defining a neutral point connected with one of the conductors of circuit 12. Each of the six phase portions of winding 15 is inductively related with only one leg of the core (not shown) of the transformer, and it is therefore easily feasible to so dispose winding 15 as to obtain therefrom an accurately balanced system of voltages when the voltages of circuit 11 are balanced.

A plurality of electric valves generally designated by 16 are serially connected with the phase portions of winding 15 across circuit 12. Valves 16 may be of any known type and are shown in the drawing as being of the vapor type severally provided with anodes 17. The anodes are preferably arranged within a common casing, the cathodes of the valves then being combined into a common cathode structure 18. Suitable means (not shown) are provided for bringing cathode 18 into electron emitting condition and for maintaining the cathode in such condition as is well known. It will be understood that valves 16 may also be divided into groups each arranged within a separate casing provided with a cathode and that each of the valves may also be provided with a separate casing, as is well known. The system above described will be recognized as being a rectifying system operable to convert alternating current received from circuit 11 into direct current to be supplied to circuit 12. It will be understood that the system may also be caused to convert direct current received from circuit 12 into alternating current to be supplied to circuit 11 by providing valves 16 with suitable known conductivity controlling means (not shown).

Anodes 17 are connected with the terminals of winding 15 through a plurality of phase shifting transformers 19, 21 for causing the voltages impressed on circuit 12 through valves 16 to form a polyphase system having a number of phases greater than the number of phases of winding 15. Transformer 19 comprises a three phase primary winding 22 inductively or conductively connected with circuit 11 and a secondary winding 23 divided into six phase portions serially connected with some of valves 16. Transformer 21 similarly comprises a three phase primary winding 24 connected with circuit 11 and a secondary winding 25 divided into six phase portions serially connected with the remainder of valves 16. While the designation of windings 22 and 24 as primary windings and of windings 23 and 25 as secondary windings implies that the flow of energy is from circuit 11 to circuit 12, for the sake of simplicity these designations will be applied regardless of the direction of flow of energy. It will be understood that when valves 16 are provided in a number multiple of 12 the different groups of 12 valves may be connected with winding 15 through a plurality of parallel pairs of phase shifting transformers similar to transformers 19 and 21.

Transformers 19, 21 are designated as phase shifting transformers for the reason that windings 23 and 25 each act independently of the flow of current through valves 16 for impressing, in a connection of each of the phase portions of winding 15, a voltage component out of phase with the voltage of the phase portion. Windings 23 and 25 are, however, so connected that the voltages severally impressed thereby on the connections of any particular phase portion of winding 15 are out of phase with each other. It is generally desired to cause current to flow simultaneously through windings 23 and 25 at every instant by inserting suitable means in the connections of transformers 19 and 21. In the embodiment illustrated in Fig. 1, the connections between windings 22 and 24 are effected through the phase portions of winding 15, winding 22 being connected with the terminals of three of the phase portions, and winding 24 being connected with the terminals of the other three phase portions of winding 15. It will be understood, however, that the connections of transformers 19 and 21 and of valves 16 may also include instead any of the electric valve paralleling devices known in the art. Winding 22 is connected in star connection for causing current to flow simultaneously through two of the phase portions of winding 23 at every instant, thereby also causing the periods of current flow through the valves connected with winding 23 to be extended beyond the duration thereof corresponding to the particular connection of winding 15. Winding 24 is likewise connected in star connection to cause the flow of current simultaneously through two portions of winding 25 at every instant.

The neutral points of windings 22 and 24 may not, however, be directly connected with the neutral point of winding 15. If the magnetic characteristics of the different legs of the core of transformers 19 and 21 are uniform, the voltages of the transformers will be balanced, but if these magnetic characteristics are not uniform, the voltages of the windings of transformers 19 and 21 will become unbalanced to a corresponding extent. If this unbalance is excessive, it may be remedied by the connection of suitable balancing means with windings 22 and 24. For example, a balancing transformer 26 may be provided comprising a star connected primary winding 27 connected with the terminals of winding 22 and defining a neutral point connected with the neutral point of winding 22. The secondary winding 28 of transformer 26 is connected in polygon connection without external connection. The connections of windings 22 and 27 comprise the windings of a three-winding reactor 29. The above described connections of a balancing transformer and a multiple winding reactor with a star connected transformer are disclosed in copending application Serial No. 151,557 of I. K. Dortort, filed July 2, 1937.

Transformer 21 is represented as being provided with balancing means comprising an inductive winding 31 divided into a plurality of phase portions in zigzag connection severally connected with the phase portions of winding 24 and defining a neutral point connected with the neutral point of winding 24. Winding 31 may be connected with winding 24 through a reactor similar to reactor 29 or else the neutral points of windings 24 and 31 may be joined through a filter comprising a reactor 32 and capacitors 33 and 34. Filter 32, 33, 34 is tuned to offer a relatively low impedance to the flow of current of the frequency of the voltage of circuit 11 and to offer a relatively high impedance to the flow of currents of frequencies multiple of the operating frequency of circuit 11, and more particularly currents of a frequency equal to three times the operating frequency.

The operation of the system will be considered under the assumption that circuit 11 is a supply circuit energized from a suitable source of alternating current (not shown) having substantially sinusoidal and balanced output voltages of predetermined frequency, and that rectified current is to be delivered by the system to a load device (not shown) connected with circuit 12. The voltages impressed from circuit 11 on the phase portions of winding 14 induce corresponding voltages in the associated phase portions of winding 15 to form a six phase system of voltages. These voltages are represented twice in Fig. 2 by two groups of six vectors 5, each group being divided in turn into two groups of three vectors arranged as a star. The voltages added to the voltages of winding 15 by winding 23 are represented by vectors 36 leading the vectors of the corresponding portions of winding 15 by 60 degrees. The voltages added to the voltages of winding 15 by winding 25 are represented by vectors 37 lagging the vectors of the corresponding portions of winding 15 by 60 degrees. The voltages of windings 23 and 25 are so chosen that the resulting voltages represented by vectors 38 form a twelve phase system of voltages which are impressed across circuit 12 through valves 16.

These voltages are impressed both during alternating current rectifying operation of the system, when they are induced by the impressed voltage of circuit 11, and during direct current inverting operation, when they are induced by the counter-electromotive force of the load devices connected with circuit 11. The different anodes 17 are thereby brought sequentially to a positive potential with respect to the potential of cathode 18. The anode momentarily having the highest positive potential carries current during a predetermined period which is terminated when the anode potential decreases below the potential of another anode, to which the current is then transferred. If windings 22 and 24 were substantially without reactance, were connected in polygon, and were connected to the same terminals of winding 15, anodes 17 would operate sequentially during periods each extending over substantially one-twelfth of a cycle of the voltage of circuit 11. Current would then flow alternately through one of the phase portions of winding 23 and one of the phase portions of winding 25, but current would not flow simultaneously through windings 23 and 25 at every instant, nor would current flow simultaneously through two portions of winding 23 or of winding 25 at every instant. Current would also flow alternately through winding 22 and through winding 24 during the course of each cycle of the voltage of circuit 11, the intermittent current in each winding comprising a current component of the fundamental frequency of the voltage of circuit 11 on which is superposed a component of higher frequency circulating between windings 22 and 24.

By connecting windings 22 and 24 to different terminals of winding 15, the circulating current must flow through winding 15 which opposes a material amount of reactance to the flow thereof. Windings 22 and 24 may also be so arranged as to have a relatively high reactance which assists the reactance of winding 15 in its effect on the circulating current. The circulating current is thus reduced in value to a sufficient extent to enable windings 22 and 24 to carry substantially equal currents at every instant. As a result of the transformer action of transformers 19 and 21, current is thus caused to flow simultaneously in substantially equal amounts through windings 23 and 25 at every instant.

Winding 22 being connected in star connection, the phase portions thereof are serially connected in pairs across the terminals of winding 15. Two of the phase portions of winding 22 thus receive the same amount of current and substantially equal currents are thus forced to flow at every instant through two of the phase portions of winding 23. For a similar reason, current flows simultaneously through two of the phase portions of winding 25 at every instant.

The total result of the connection of windings 22 and 24 in star and of the interconnection thereof through winding 15 is to cause current to flow simultaneously through four anodes 17 at every instant, with the further result that the periods of current flow through each anode are extended substantially four-fold to a duration of substantially one-third of a cycle. For a given output of the system, the magnitude of the anode currents is reduced fourfold, thus reducing the resistance losses in the system and improving the efficiency thereof. The pulsating currents flowing through valves 16 form a twelve-phase system of currents, thereby causing the current flowing between circuit 11 and winding 14 to contain a lesser number of harmonic components than are present when the currents flowing through the valves form only a six phase system.

The flow of current through each anode, which is equal to one-quarter of the total current of the system, is transferred between anodes receiving resultant voltages from windings 15 and 23 or 15 and 25, having a phase difference of 120 electrical degrees. The system thus operates as four independent three phase systems functioning under the four three phase systems of voltages represented in Fig. 2. The four resultant voltages thus simultaneously impressed on circuit 12 are generally of different values and the difference between such values and the common voltage actually present between the conductors of circuit 12 appears as third harmonic voltage components in the phase portions of windings 23 and 25. Similar concurrent harmonic components are induced thereby in the different phase portions of winding 22 and in the different phase portions of winding 24. The core of transformer 19 must therefore be of the type in which the magnitude of the magnetic fluxes of different phases are independent of one another, such as the shell type. The harmonic components, however, may not appear in the windings of transformer 26 in which winding 28 forms a short circuit for third harmonic current. The flow of such harmonic current between winding 22 and 27, which would prevent the operation of transformer 19 to cause simultaneous flow of current through two portions of winding 23, is substantially prevented by means of reactor 29.

The voltages of the different phase portions of winding 27 are maintained balanced by the inductive relation of winding 27 with winding 28, in which the voltages are necessarily balanced by reason of the polygon connection thereof. If the voltages of the phase portions of winding 22 become unbalanced, balancing magnetizing current of fundamental frequency will flow between windings 22 and 27 to restore the phase voltages of winding 22 to a substantially balanced condition. The phase voltages of winding 24 are similarly balanced by current of fundamental frequency flowing between windings 24 and 31, in which the voltages are balanced by reason of the zigzag connection of the phase portions thereof. The balancing current of fundamental frequency flows freely through filter 32, 33, 34 while currents of third harmonic frequency are prevented by the filter from flowing through any of the connections between windings 24 and 31.

The embodiment illustrated in Fig. 3 comprises eighteen valves which are preferably arranged within a common casing. Some of the valves, six in number, are connected with the terminals of winding 15 through an interphase transformer 39 while the remainder of the valves are connected with the phase portions of winding 15 through the phase shifting transformers 19 and 21. Transformer 19 connects some of the valves, other than those connected with interphase transformer 39, with a suitable intermediate point of each of the phase portions of winding 15, and transformer 21 connects the remainder of the valves with the same intermediate points. Windings 22 and 24 are again connected with different phase portions of winding 15 for causing current to flow simultaneously through the valves connected with windings 23 and 25. The insertion of the outer part of the phase portions of winding 15 in the connections of windings 22 and 24 with transformer 39 likewise causes current to flow simultaneously through the valves connected with the terminals of winding 15 and through the valves connected with the intermediate points thereof.

Interphase transformer 39 causes the valves connected therewith to function in two groups carrying current simultaneously under voltages again represented by vectors 35 in Fig. 4. In the present embodiment, the voltages impressed by winding 15 on circuit 12 through windings 23 and 25 are of smaller magnitude represented by vectors 41. The voltages added thereto by winding 23 are represented by vectors 42 and the voltages added by winding 25 are represented by vectors 43. The voltages of windings 23 and 25 and the connections thereof with winding 15 are so chosen that the resultant voltages impressed on circuit 12 are represented by vectors 44 of the same magnitude as vectors 35, but displaced in phase with respect thereto by twenty electrical degrees. The voltages impressed on circuit 12 through all valves 16 are represented by the joint vectors 35 and 44 and form a balanced polyphase system of voltages comprising eighteen phases. Under the action of interphase transformer 39 and of transformers 19 and 21, the system operates as six independent three phase systems functioning under the six three phase systems of voltages represented in Fig. 4. In the present embodiment balancing of the phase voltages of transformer 21 is shown as being obtained by connecting filter 32, 33, 34 between the neutral points of windings 24 and 15. The filter permits the flow of balancing current of fundamental frequency between windings 15 and 24 while substantially preventing the flow of third harmonic current therebetween. The connection of windings 22 and 15 may be effected similarly through a filter 45, 46, 47.

The embodiment partially illustrated in Fig. 5 comprises 24 valves which are preferably arranged in two or more separate containers. Some of valves 16 are connected with the terminals of the phase portions of winding 15 through the secondary winding 48 of a phase shifting transformer 49 having a primary winding 51 or through the secondary winding 52 of another phase shifting transformer 53 having a primary winding 54. Windings 23 and 25 connect the remainder of valves 16 with suitably chosen intermediate points of winding 15. The voltages impressed on circuit 12 from the intermediate points of winding 15 are represented by vectors 55 in Fig. 6 and the voltages added thereto by windings 23 and 25 are represented by vectors 56 and 57, respectively. The voltages added to the terminal voltages of winding 15 by windings 48 and 52 are represented by vectors 58 and 59, respectively. The voltages of all the windings are so chosen that the resultant voltages impressed across circuit 12 and represented by vectors 61 form a balanced twenty-four phase system of voltages.

In the present embodiment the circulating current component tending to flow between windings 22 and 24 is of relatively high frequency, and the reactance of windings 22 and 24 alone may be sufficient to limit such circulating current to a relatively low value, even when these windings are connected across the same points of winding 15. Windings 51 and 54 may generally likewise be connected across the same points of transformer winding 15. It will be observed that the voltages impressed on circuit 12 through windings 23 and 48, for example, form a balanced twelve phase system of voltages so that transformers 13, 19 and 49 could be used alone, if transformers 21 and 53 were removed from the system. In prevision of this eventuality, windings 23 and 48 may be connected with anodes 17 all contained within a single casing, windings 25 and 52 being connected with the anodes contained within the other casing.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an electric current converting system, the combination with a polyphase alternating current circuit, a direct current circuit, a transformer comprising a winding connected with said alternating current circuit and a winding divided into portions forming a polyphase system of a predetermined number of phases, and a plurality of electric valves serially connected with said phase portions across said direct current circuit, of means connected with said valves acting independently of the flow of current through said valves for causing the voltages impressed on said direct current circuit through said valves to form a polyphase system having a number of phases greater than the first said number of phases.

2. In an electric current converting system, the combination with a polyphase alternating current circuit, a direct current circuit, a transformer comprising a winding connected with said alternating current circuit and a winding divided into portions forming a polyphase system of a predetermined number of phases, and a plurality of electric valves serially connected with said phase portions across said direct current circuit, of means for causing the voltages impressed on said direct current circuit through said valves to form a polyphase system having a number of phases greater than the first said number of phases comprising a phase shifting transformer having a primary winding connected with said alternating current circuit and a secondary winding divided into a plurality of phase portions serially connected with some of said valves.

3. In an electric current converting system, the combination with a polyphase alternating current circuit, a direct current circuit, a transformer comprising a winding connected with said alternating current circuit and a winding divided into portions forming a polyphase system of a predetermined number of phases, and a plurality of electric valves serially connected with said phase portions across said direct current circuit, of means distinct from said transformer connected with said valves for causing the voltages impressed on said direct current circuit through said valves to form a polyphase system having a number of phases greater than twice said predetermined number of phases.

4. In an electric current converting system, the combination with a polyphase alternating current circuit, a direct current circuit, a transformer comprising a winding connected with said alternating current circuit and a winding divided into portions forming a polyphase system of a predetermined number of phases, and a plurality of electric valves serially connected with said phase portions across said direct current circuit, of means for causing the voltages impressed on said direct current circuit through said valves to form a polyphase system having a number of phases greater than the first said number of phases comprising a plurality of phase shifting transformers each having a primary winding connected with said alternating current circuit and a secondary winding divided into a plurality of phase portions serially connected with some of said valves.

5. In an electric current converting system, the combination with a polyphase alternating current circuit, a direct current circuit, a transformer comprising a winding connected with said alternating current circuit and a winding connected with said direct current circuit and divided into portions forming a polyphase system of a predetermined number of phases, and a plurality of electric valves connected with said direct current circuit, of means for causing the voltages impressed on said direct current circuit through said valves to form a polyphase system having a number of phases greater than the first said number of phases comprising means connecting some of said valves with the terminals of said phase portions and phase shifting means connecting the remainder of said valves with intermediate points of said phase portions.

6. In an electric current converting system, the combination with a polyphase alternating current circuit, a direct current circuit, a transformer comprising a winding connected with said alternating current circuit and a winding divided into portions forming a polyphase system of a predetermined number of phases, and a plurality of electric valves serially connected with said phase portions across said direct current circuit for the flow of current therethrough during predetermined periods, of means for extending the periods of current flow through particular ones of said valves comprising a transformer having a star connected primary winding connected with said alternating current circuit and a secondary winding divided into a plurality of phase portions serially connected with said ones of said valves.

7. In an electric current converting system, the combination with a polyphase alternating current circuit, a direct current circuit, a transformer comprising a winding connected with said alternating current circuit and a winding connected with said direct current circuit and divided into portions forming a polyphase system of a predetermined number of phases, and a plurality of electric valves connected with said direct current circuit, of means for causing the voltages impressed on said direct current circuit through said valves to form a polyphase system having a number of phases greater than the first said number of phases comprising phase shifting means connecting some of said valves with the terminals of said phase portions and other phase shifting means connecting the remainder of said valves with intermediate points of said phase portions.

8. In an electric current converting system, the combination with a polyphase alternating current circuit, a direct current circuit, a transformer comprising a winding connected with said alternating current circuit and a winding connected with said direct current circuit and divided into portions forming a polyphase system of a predetermined number of phases, and a plurality of electric valves connected with said direct current circuit and with said phase portions, of means distinct from said transformer for causing the voltages impressed on said direct current circuit through said valves to form a polyphase system having a number of phases greater than the first said number of phases comprising phase shifting means connecting some of said valves with intermediate points of said phase portions.

9. In an electric current converting system, the combination with a polyphase alternating current circuit, a direct current circuit, a transformer comprising a winding connected with said alternating current circuit and a winding connected with said direct current circuit and divided into portions forming a polyphase system of a predetermined number of phases, and a plurality of electric valves connected with said direct current circuit, of means for causing the voltages impressed on said direct current circuit through said valves to form a polyphase system having a number of phases greater than the first said number of phases comprising means connecting some of said valves with the terminals of said phase portions, a phase shifting transformer connecting others of said valves with an intermediate point of each of said phase portions, and another phase shifting transformer connecting the remainder of said valves with said intermediate points.

10. In an electric current converting system, the combination with a polyphase alternating current circuit, a direct current circuit, a transformer comprising a winding connected with said alternating current circuit and a winding connected with said direct current circuit and divided into portions forming a polyphase system of a predetermined number of phases, and a plurality of electric valves connected with said direct current circuit, of means for causing the voltages impressed on said direct current circuit through said valves to form a polyphase system having a number of phases greater than the first said number of phases comprising a plurality of phase shifting transformers connecting some of said valves with the terminals of said phase portions, a phase shifting transformer connecting others of said valves with an intermediate point of each of said phase portions, and another phase shifting transformer connecting the remainder of said valves with said intermediate points.

11. In an electric current converting system, the combination with a polyphase alternating current circuit, a direct current circuit, a transformer comprising a winding connected with said alternating current circuit and a winding divided into portions forming a polyphase system of a predetermined number of phases, and a plurality of electric valves serially connected with said phase portions across said direct current circuit, of means for causing the voltages impressed on said direct current circuit through said valves to form a polyphase system having a number of phases greater than the first said number of phases comprising a plurality of phase shifting transformers each having a primary winding connected with said alternating current circuit and a secondary winding divided into a plurality of phase portions serially connected with some of said valves, the said connections of said phase shifting transformers comprising means for causing current to flow simultaneously through the several said secondary windings at every instant.

12. In an electric current converting system, the combination with a polyphase alternating current circuit, a direct current circuit, a transformer comprising a winding connected with said alternating current circuit and a winding connected with said direct current circuit and divided into portions forming a polyphase system of a predetermined number of phases, and a plurality of electric valves connected with said direct current circuit, of means for causing the voltages impressed on said direct current circuit through said valves to form a polyphase system having a number of phases greater than the first said number of phases comprising means connecting some of said valves with the terminals of said phase portions and phase shifting means connecting the remainder of said valves with intermediate points of said phase portions, the said connections of said phase shifting means comprising means for causing current to flow simultaneously through the valves connected with said terminals and through the valves connected with said intermediate points.

13. In an electric current converting system, the combination with a polyphase alternating current circuit, a direct current circuit, a transformer comprising a winding connected with said alternating current circuit and a winding divided into portions forming a polyphase system of a predetermined number of phases, and a plurality of electric valves serially connected with said phase portions across said direct current circuit, of means for causing the voltages impressed on said direct current circuit through said valves to form a polyphase system having a number of phases greater than the first said number of phases comprising a phase shifting transformer having a primary winding connected with said alternating current circuit and a secondary winding divided into a plurality of phase portions serially connected with some of said valves, said primary winding being connected in star connection for causing current to flow simultaneously through two of the second said phase portions at every instant.

14. In an electric current converting system, the combination with a polyphase alternating current circuit, a direct current circuit, a transformer comprising a winding connected with said alternating current circuit and a winding divided into portions forming a polyphase system of a predetermined number of phases, and a plurality of electric valves serially connected with said phase portions across said direct current circuit, of means for causing the voltages impressed on said direct current circuit through said valves to form a polyphase system having a number of phases greater than the first said number of phases comprising a plurality of phase shifting transformers each having a secondary winding divided into a plurality of phase portions serially connected with some of said valves and each having a primary winding, said primary windings being severally connected with different ones of the first said phase portions, whereby current is caused to flow simultaneously through the several said secondary windings.

15. In an electric current converting system, the combination with a polyphase alternating current circuit, a direct current circuit, a transformer comprising a winding connected with said alternating current circuit and a winding divided into portions forming a polyphase system of a predetermined number of phases, and a plurality of electric valves serially connected with said phase portions across said direct current circuit, of means for causing the voltages impressed on said direct current circuit through said valves to form a polyphase system having a number of phases greater than the first said number of phases comprising means acting independently of the flow of current through said valves for impressing in a connection of each one of said phase portions a voltage component out of phase with the voltage of the same one of said phase portions.

16. In an electric current converting system, the combination with a polyphase alternating current circuit, a direct current circuit, a transformer comprising a winding connected with said alternating current circuit and a winding divided into portions forming a polyphase system of a predetermined number of phases, and a plurality of electric valves serially connected with said phase portions across said direct current circuit, of means for causing the voltages impressed on said direct current circuit through said valves to form a polyphase system having a number of phases greater than the first said number of phases comprising a plurality of phase shifting transformers each having a secondary winding divided into a plurality of phase portions serially connected with some of said valves and each having a primary winding, said primary windings being connected in star connection and being severally connected with different ones of the first said phase portions, whereby current is caused to flow simultaneously through two phase portions of each said secondary winding at every instant.

17. In an electric current converting system, the combination with a polyphase alternating current circuit, a direct current circuit, a transformer comprising a winding connected with said alternating current circuit and a winding connected with said direct current circuit and divided into portions forming a polyphase system of a predetermined number of phases, and a plurality of electric valves connected with said direct current circuit, of means for causing the voltages impressed on said direct current circuit through said valves to form a polyphase system having a number of phases greater than the first said number of phases comprising an interphase transformer connecting some of said valves with the terminals of said phase portions, and phase shifting means connecting the remainder of said valves with said phase portions.

18. In an electric current converting system, the combination with a polyphase alternating current circuit, a direct current circuit, a transformer comprising a winding connected with said alternating current circuit and a winding divided into portions forming a polyphase system of a predetermined number of phases, and a plurality of electric valves serially connected with said phase portions across said direct current circuit, of means for causing the voltages impressed on said direct current circuit through said valves to form a polyphase system having a number of phases greater than the first said number of phases comprising a phase shifting transformer having a primary winding connected with said alternating current circuit and divided into a plurality of phase portions connected in star connection, and means connected with said primary winding for balancing the voltages of the said phase portions.

19. In an electric current translating system, the combination with a polyphase alternating current circuit, a transformer having a winding connected with said alternating current circuit, said winding being divided into a plurality of phase portions connected in star connection and defining a neutral point, and means for balancing the voltages of said phase portions comprising a transformer having a primary winding divided into a plurality of phase portions severally connected with the terminals of the first said phase portions and defining a neutral point and having a secondary winding connected in polygon connection.

20. In an electric current translating system, the combination with a polyphase alternating current circuit, a transformer having a winding connected with said alternating current circuit, said winding being divided into a plurality of phase portions connected in star connection and defining a neutral point, and means for balancing the voltages of said phase portions comprising an inductive winding divided into a plurality of phase portions in zigzag connection severally connected with the first said phase portions and defining a neutral point connected with the first said neutral point.

21. In an electric current translating system, the combination with a polyphase alternating current circuit, and a transformer connected with said alternating current circuit and having a winding divided into a plurality of phase portions connected in star connection and defining a neutral point, of means for balancing the voltages of said phase portions comprising an inductive winding divided into a plurality of phase portions connected in star connection and defining a neutral point connected with the first said neutral point, a reactor having windings severally connecting the first said phase portions with the second said phase portions, and means linking together the second said phase portions.

22. In an electric current translating system, the combination with a polyphase alternating current circuit, and a transformer connected with said alternating current circuit, and having a winding divided into a plurality of phase portions connected in star connection and defining a neutral point, of means for balancing the voltages of said phase portions comprising an inductive winding divided into a plurality of phase portions connected in star connection defining a neutral point and serially connected with the first said phase portions, a filter connecting the first said neutral point with the second said neutral point, and means linking together the second said phase portions.

23. In an electric current translating system, the combination with a polyphase alternating current circuit, and a transformer connected with said alternating current circuit, the said transformer having a winding divided into a plurality of phase portions connected in star connection and defining a neutral point, of means for balancing the voltages of said phase portions comprising a transformer having a winding divided into a plurality of phase portions severally connected with the terminals of the first said phase portions and defining a neutral point connected with the first said neutral point, and having a winding connected in polygon connection.

24. In an electric current translating system, the combination with a polyphase alternating current circuit, and a transformer connected with said alternating current circuit and having a winding divided into a plurality of phase portions connected in star connection and defining a neutral point, of means for balancing the voltages of said phase portions comprising an inductive winding divided into a plurality of phase portions in zigzag connection severally connected with the first said phase portions and defining a neutral point, and a filter connecting the first said neutral point with the second said neutral point.

25. In an electric current translating system, the combination with a polyphase alternating current circuit, and a transformer connected with said alternating current circuit and having a winding divided into a plurality of phase portions connected in star connection and defining a neutral point, of means for balancing the voltages of said portions comprising an inductive winding divided into a plurality of phase portions in zigzag connection severally connected with the first said phase portions and defining a neutral point, and a filter connecting the first said neutral point with the second said neutral point, the said filter being tuned to permit the flow of balancing current therethrough of the fundamental frequency of said circuit and to substantially prevent the flow of current of the third harmonic frequency of said circuit through either of said windings.

ISADORE K. DORTORT.